United States Patent [19]

Campana

[11] Patent Number: 4,660,807
[45] Date of Patent: Apr. 28, 1987

[54] WRAPPED THERMAL TORCH AND METHOD

[76] Inventor: Patsie C. Campana, 255 W. Park Dr., Lorain, Ohio 44053

[21] Appl. No.: 824,789

[22] Filed: Jan. 31, 1986

[51] Int. Cl.$^4$ ............................................. B23K 9/24
[52] U.S. Cl. .................................. 266/75; 219/69 E; 219/70
[58] Field of Search ................ 266/75, 48; 219/69 R, 219/69 W, 69 C, 69 E, 70, 72

[56] References Cited

U.S. PATENT DOCUMENTS

| | | | |
|---|---|---|---|
| 3,591,758 | 7/1971 | Clucas | 219/70 |
| 4,069,407 | 1/1978 | Brower | 219/70 |
| 4,114,863 | 9/1978 | Campana | 266/48 |
| 4,416,444 | 11/1983 | Brower | 219/70 |

Primary Examiner—Wayland Stallard
Attorney, Agent, or Firm—Fay, Sharpe, Fagan, Minnich & McKee

[57] ABSTRACT

A consumable thermal torch includes inner and outer casings having a first gas flow passage defined therebetween. At least one burning rod is received in the inner casing further defining second gas flow passages. Each of the inner and outer casings is a multi-layer wrapped construction facilitating ease of assembly. The wrapped casings are formed with a powder mix including an effective amount of an exothermic adjuvant. The preferred exothermic adjuvant is magnesium. The powder mix and wrapped casings are each welded or brazed to form integral structures. The magnesium content increases the exothermic reaction temperature of the thermal torch to at least 6000° F.

12 Claims, 3 Drawing Figures

WRAPPED THERMAL TORCH AND METHOD

BACKGROUND OF THE INVENTION

This invention pertains to the art of thermal torches and more particularly to consumable thermal torches or lances. The invention is particularly applicable to an oxygen lance typically employed for boring, cutting, burning, and the like of hard base materials and will be described with particular reference thereto. However, it will be appreciated that the invention has broader applications and may be advantageously employed in other environments and applications.

Commonly owned U.S. Pat. No. 4,114,863, which is hereby incorporated by reference, generally describes the background of a thermal torch in which hard base materials such as ferrous metal, slag, concrete and the like may be pierced or cut through due to the rapid, exothermic oxidation of iron in the presence of oxygen. Oxygen is supplied under pressure to one end of the thermal torch and is ignited at the other end for thermic reaction with the base material. Control of the pressure and amount of oxygen release from the ignited end, in turn, controls the thermic reaction of the torch for cutting and the like. The thermal torch is consumed by this reaction and, therefore, must be replaced from time to time with a new length of pipe or tubing.

U.S. Pat. No. 4,114,863 patent describes a marked improvement in the thermal torch art by which the so-called "splatter" problem, as well as flame spreading, is controlled. A pair of inner and outer casings define a first gas flow passage therebetween while the inner casing includes a plurality of elongated burning rods. The burning rods define a series of second gas flow passages in the inner casing for the primary thermic reaction. The center portion of the thermal torch is burned back approximately one half inch from the outer casing whereby the first gas flow passage forms a substantially continuous oxygen shield to limit the splattering at the thermic reaction site.

With renewed interest in use of thermal torches, it has been considered desirable to increase the temperature at which the thermic reaction takes place. An increase in thermic reaction temperature necessarily provides a wider spectrum of materials which may be cut. Additionally, a simplified method of forming the oxygen lance is always desired. Accordingly, the subject invention creates the highest exothermic reaction known in the industry through the enhancement of the benefits provided by the above-noted patented structure.

SUMMARY OF THE INVENTION

In accordance with the invention, a consumable thermal torch comprises a hollow outer casing having an inlet end, a discharge end, and a generally smooth inner wall containing or having in contact therewith an effective amount of an exothermic adjuvant. A hollow inner casing also has an inlet end, a discharge end, and a generally smooth outer wall. An outside cross sectional dimension of the inner casing is less than the inside cross sectional dimension of the outer casing defining a first gas flow passage substantially surrounding the inner casing. At least one rod is closely received in the inner casing and extends between the inlet and discharge ends thereof. The rod has a cross-sectional dimension less than the inner cross sectional dimension of the inner casing defining a second gas flow passage therebetween.

In accordance with a further aspect of the invention, the inner casing also contains or has in contact therewith an effective amount of an exothermic adjuvant.

In accordance with another aspect of the invention, the inner and outer casings are planar constructions wrapped and brazed together into a multi-layer configuration with a powder mix having the specified magnesium content therein.

In accordance with another aspect of the invention, the burning rods may be of steel or aluminum composition.

In accordance with a method of forming the thermal torch, first and second generally elongated, planar sheets have a filler material spread on a predetermined portion thereof. The filler material includes approximately 2% magnesium and the sheets are rolled about a generally longitudinal axis. The rolled sheets form a multi-layer construction that is welded together and the first rolled sheet is inserted into the second rolled sheet.

A principle advantage of the subject invention resides in the ability to create the highest exothermic reaction known in the industry.

Another advantage of the invention resides in the simplified construction of the thermal torch.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts. A preferred embodiment will be described in detailed in this specification and illustrated in the accompanying drawings which form a part thereof and wherein.

DETAILED DESCRIPTION OF THE PREFERRED EMBODIMENT

Figure 1:
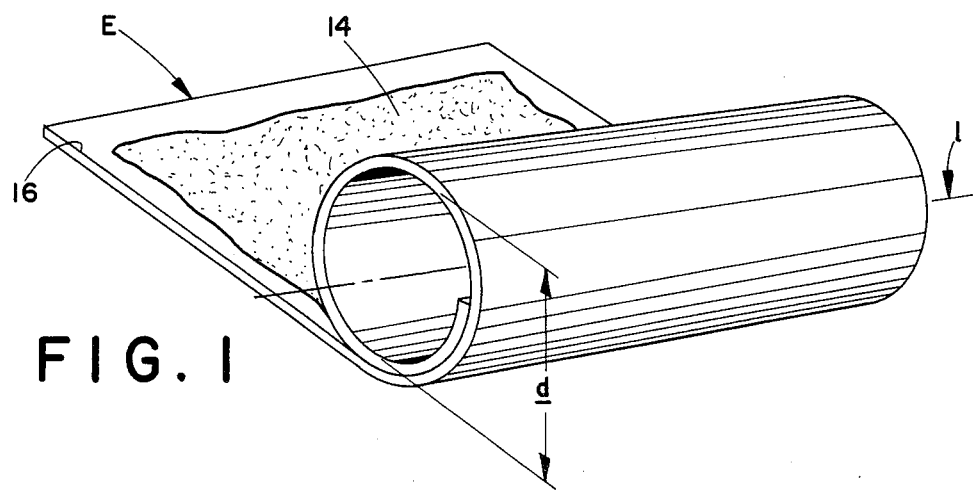
FIG. 1 is a perspective view of the formation of a wrapped tubing assembly.

Referring now to the drawings wherein the showings are for purposes of illustrating the preferred embodiment of the invention only and not for purposes of limiting same, the FIGURES show a thermal torch or lance A comprised of an outer sleeve or casing B and an inner sleeve or casing C. A plurality of fuel or burning rods D are closely received in the inner casing.

More particularly, and with reference to FIG. 1, a first generally planar sheet E has a rectangular conformation of predetermined length and width. The planar sheet has a minimum thickness whereby the sheet is sufficiently deformable for rolling about a generally longitudinal axis l. The generally planar sheet E may be formed of an appropriate material, such as sheet steel or the like, that generally retains its form upon deformation into a generally cylindrical configuration. The cylindrical configuration has a preselected diameter d that will vary depending on whether the sheet forms the inner casing C or the outer casing B of the thermal torch assembly. Therefore, as is apparent, the inner and outer casings are both formed from similar planar sheets E and, in the following discussion, the description of either the inner or outer casing will be equally applicable to the other casing unless specifically noted otherwise.

A powder mix 14 is a conventional hydrogen braze mix to which an exothermic adjuvant, which in this case is approximately 2% magnesium, has been added. The addition of the exothermic adjuvant, i.e., magnesium, to the conventional braze mix composition enhances the thermic reaction results to achieve an increased temperature. The mix is spread over a preselected portion of a first surface 16 of the planar sheet E. The preselected portion is generally substantially less than the full surface area of the first surface 16 whereby the planar sheet, when rolled into its cylindrical configuration, disposes the powder mix between radially adjacent layers 18, 20.

Typically, each wrapped tubing or casing B, C is at least double-wrapped to provide sufficient structural strength to the assembly. Once the sheet has been rolled into cylindrical or tubular form, individual radial layers 18, 20 are integrally joined by welding. Welding is a generic term that covers the joining of metals by the application of heat. More particularly, a group of welding processes wherein coalescence is produced by heating to a temperature above 800° F. and by using a suitable filler metal having a melting point below that of the base metals is generally defined as brazing. The selection of the material of construction of the planar sheet E maintains the radial layers in a fixed relative position during heating and cooling of the assembly. A predetermined brazing process is selected that provides the most advantageous temperature, heat distribution, and rate of heating and cooling with respect to the properties of the base metal and filler material.

The inner and outer casings are, thereby, formed by the above process such that the brazed casings include a fusion material having magnesium, or in other situations copper or the like, disposed therein. The multi-layered outer casing B has a first or inlet end 30 and a second or discharge end 32 axially spaced therefrom. An inner diameter surface 34 is generally smooth to form the outer annular surface of a gas flow passage as will be described hereinbelow.

Figure 2:
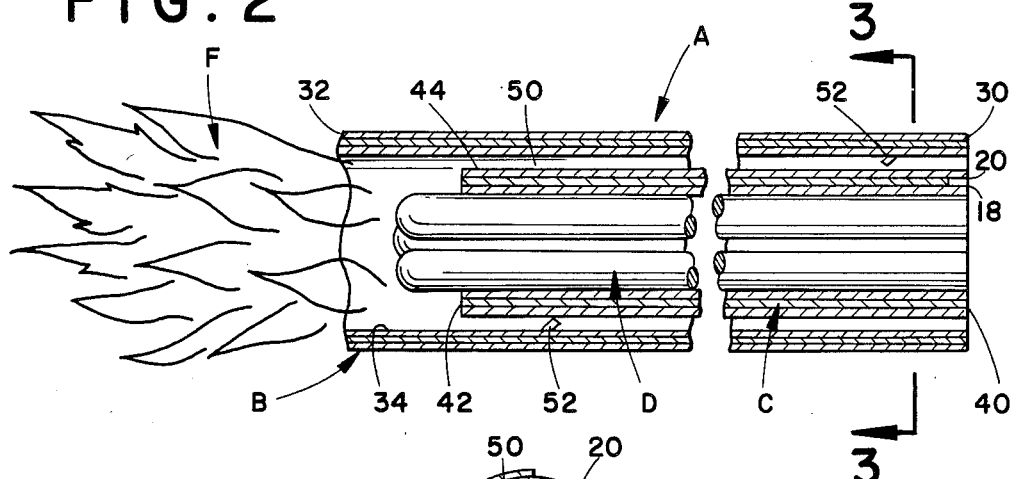
FIG. 2 is a cross-sectional view along a longitudinal axis of the assembled thermal torch in accordance with the subject invention; and, FIG. 3 is a cross-sectional view generally along lines 3—3 in FIG. 2.
Figure 3:
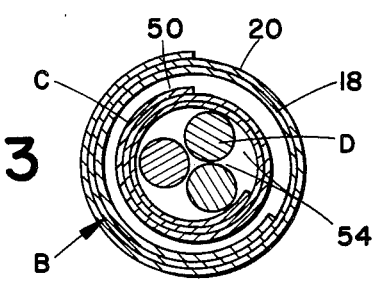

The inner casing C similarly includes a first or inlet end 40 and a second or discharge end 42 axially disposed therefrom. The inner casing necessarily has an outer diametrical dimension less than the inner diametrical dimension of the outer casing B and the inner and outer casings are generally coextensive along their lengths. The outer circumferential surface 44 of the inner casing is spaced from the smooth inner diameter wall 34 of the outer casing defining a first gas flow passage 50 therebetween. The first gas flow passage extends from the inlet ends 30, 40 to the discharge ends 32, 42 and is substantially circumferentially continuous between the inner and outer casings. As illustrated in FIG. 2, the inner and outer casings are generally axially aligned at their inlet ends while the discharge ends are axially spaced from one another. The inner and outer casings may be concentrically arranged or, alternatively, the casings may be off-center defining a generally crescent shaped first gas flow passage 50. In either arrangement, the first gas flow passage substantially encompasses the inner casing. The relative positioning between the inner and outer casings is maintained by a plurality of detents 52 that extend radially inward from the outer casing B to abutting engagement with the inner casing. Conventional metal working techniques may be used to form the detents and maintain the inner and outer in a substantially space relation. The detents are axially and circumferentially arranged at spaced intervals along the thermal torch in order to provide sufficient support as the torch is consumed.

A plurality of burning rods D are closely received within the inner casing. Typically, the burning rods are made of a composition of metal that has a high quantity of aluminum or steel, these compositions chemically fueling the reaction at the discharge end of the thermal torch. The burning rods are illustrated as of generally cylindrical conformation although it is appreciated that other cross sectional conformations may be used with equal success. Positioning of the burning rods within the inner casing defines a plurality of second gas flow passages 54 interposed between the burning rods and inner casings in addition to the interstices between the burning rods themselves.

As is well known, a pressurized source of oxygen is supplied to the inlet end of the thermal torch and the discharge end is ignited. Once ignited, combustion is self supporting through the continuous supply of oxygen so that a cutting flame is directed axially outward from the torch toward an associated workpiece. The oxygen flowing through the second gas flow passages 54 reacts with the burning rods and inner casing to form the primary thermic reaction site. Since the primary thermic reaction site is centered between the burning rods and the inner casing C, these components will be consumed at a slightly faster rate than will the outer casing B. Thus, as illustrated in FIG. 2, the discharge end of the inner casing and the burning rods are axially spaced inward from the discharge end of the outer casing B.

The first gas plow passage 50 provides a gas curtain or shielding effect for the primary thermic reaction. The shielding effect provided by the first gas flow passage thus reduces splattering that was prevalent in other construction. It is apparent that the substantially continuous passage between the inner and outer casings promotes the shielding effect. Additionally, the gas curtain offers the additional feature of confining the flame F into a bullet-like configuration that focuses and intensifies the thermic reaction. Precise, narrow cuts are thereby formed with the thermal torch.

The presence of an exothermic adjuvant in the fusion brazed casings creates an exothermic reaction that facilitates a higher temperature than previously attained in the industry. In this regard, as used herein the term "exothermic adjuvant" is intended to mean any metal which is different than that from which the concerned casing is fabricated, which when oxidized together with such casing results in a higher temperature than realized when the casing is oxidized in the absence of such metal. Copper and/or magnesium are excellent exothermic adjuvant materials. However, other metals and/or alloys may be employed, provided the desired results are achieved. When magnesium is employed, a temperature of 6000° F. or greater is readily achieved and allows vaporization of substances that cannot withstand such a temperature magnitude. The thermic reaction is easily controlled by regulating the amount of the exothermic adjuvant, which preferably is magnesium, and/or copper, in the powder mix. A fusion mix containing from an effective amount up to about 2% (by weight) magnesium is considered ideal.

The invention has been described with reference to the preferred and alternative embodiments. Obviously, modifications and alterations will occur to others upon a reading and understanding of this specification. It is intended to include all such modifications and alterations in so far as they come within the scope of the appended claims or the equivalents thereof.

Having thus described the invention, it is now claimed:

1. A consumable thermal torch comprising:
    an elongated open-ended hollow outer casing having an inlet end, a discharge end, and a generally smooth inner wall, said outer casing including an effective amount of an exothermic adjuvant;
    an elongated open-ended hollow inner casing having an inlet end, a discharge end, and a generally smooth outer wall;
    an outside cross sectional dimension of said inner casing being less than the inside cross sectional dimension of said outer casing, said inner casing being received in said outer casing such that respective inlet and discharge ends of said casings are generally coextensive and defining a first gas flow passage substantially surrounding said inner casing in a continuous manner; and,
    a rod closely received in said inner casing extending between said inlet and discharge ends thereof, said rod having an outer cross sectional dimension less than an inner cross sectional dimension of said inner casing defining a second gas flow passage therebetween.

2. The thermal torch as defined in claim 1 wherein said outer casing is of multi-layer construction welded together with a powder mix having magnesium therein for producing an exothermic reaction at said discharge end of at least 6000° F.

3. The thermal torch as defined in claim 2 wherein said inner casing is of multi-layer construction.

4. The thermal torch as defined in claim 3 wherein said inner casing is welded together with a powder mix having magnesium therein.

5. The thermal torch as defined in claim 1 wherein said inner casing is generally radially spaced from said outer casing by a plurality of detents.

6. The thermal torch as defined in claim 1 wherein said rod has an aluminum composition.

7. The thermal torch as defined in claim 1 wherein said rod has a steel composition.

8. The thermal torch as defined in claim 1 wherein said inner and outer casings are concentric.

9. A consumable thermal torch comprising:
    an outer hollow casing having first and second open ends and a generally smooth inner diameter surface, said outer casing being generally wrapped to a configuration having at least two layers;
    an inner hollow casing having first and second open ends and a generally smooth outer diameter surface, said inner casing being generally wrapped to a configuration having at least two layers;
    said inner casing received in said outer casing defining a substantially continuous gas flow passage therebetween;
    means for retaining said inner and outer casings in spaced relation; and,
    at least one rod closely received in said inner casing defining plural second gas flow passages therebetween.

10. The thermal torch as defined in claim 9 wherein said inner casing layers are brazed together with a filler material having magnesium therein.

11. The thermal torch as defined in claim 9 wherein said outer casing layers are brazed together with a filler material having magnesium therein.

12. The thermal torch as defined in claim 9 wherein said retaining means includes plural detents extending between said inner and outer casings.

* * * * *